W. M. WAMPLER & W. L. CONWELL.
GRAB HANDLE FOR STANCHIONS.
APPLICATION FILED JULY 19, 1916.
1,203,821.
Patented Nov. 7, 1916.
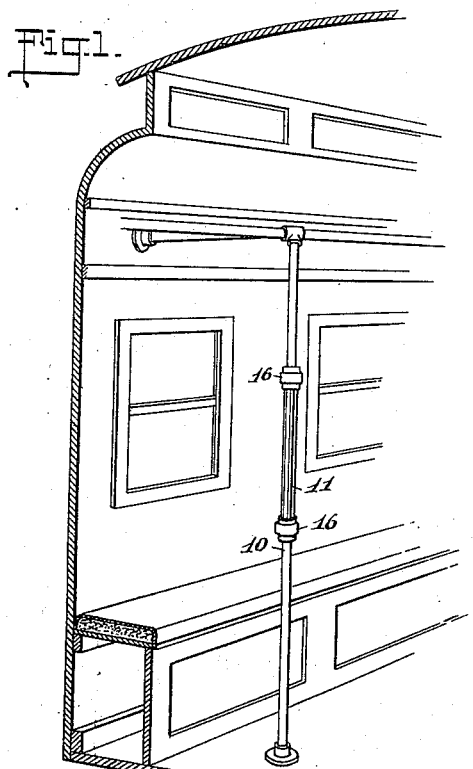
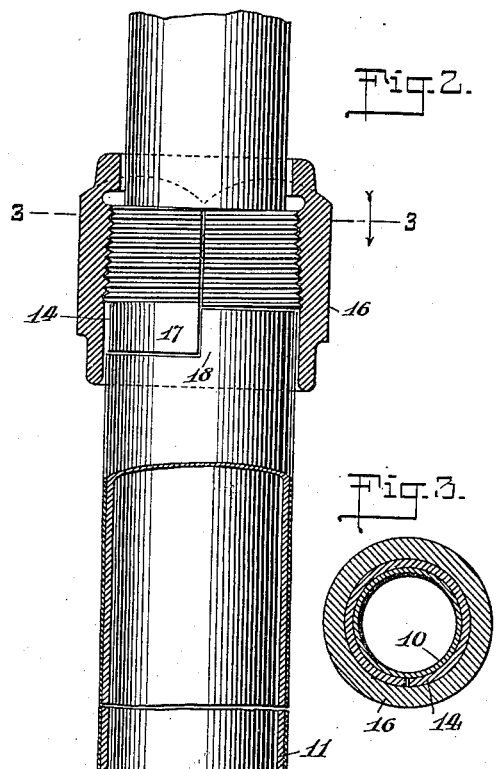
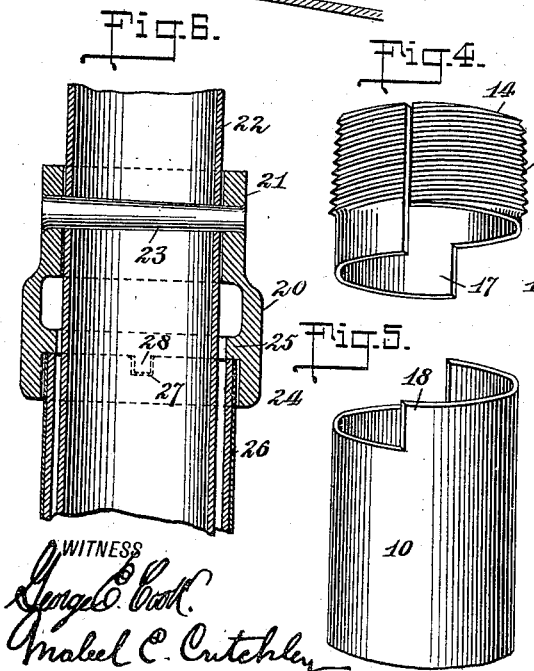
INVENTORS
Walter L. Conwell.
William M. Wampler.
BY
George Cook + Sons
ATTORNEYS

UNITED STATES PATENT OFFICE.

WILLIAM M. WAMPLER, OF NEW YORK, N. Y., AND WALTER L. CONWELL, OF UPPER MONTCLAIR, NEW JERSEY, ASSIGNORS TO THE ELLCON COMPANY, OF NEW YORK, N. Y., A CORPORATION OF NEW YORK.

GRAB-HANDLE FOR STANCHIONS.

1,203,821.

Specification of Letters Patent.

Patented Nov. 7, 1916.

Application filed July 19, 1916. Serial No. 110,031.

*To all whom it may concern:*

Be it known that we, WILLIAM M. WAMPLER, a citizen of the United States, and a resident of New York, borough of Manhattan, in the county of New York and State of New York, and WALTER L. CONWELL, a citizen of the United States, and a resident of Upper Montclair, in the county of Essex and State of New Jersey, have made and invented certain new and useful Improvements in Grab-Handles for Stanchions, of which the following is a specification.

This invention relates to a grab handle which may be used upon stanchions, railings, or analogous structures, which are grasped and used as a support by the public.

An object of the present invention is to do away with the enameling of the entire stanchion or railing and to provide upon the stanchion an enameled grab handle, of limited length, and occupying only that portion of the stanchion or railing which is used as a hand support.

A further object is to provide a grab handle having an enamel or vitreous coating thereon which, in addition to presenting a neat and pleasing appearance may be easily maintained in a clean and sanitary condition. Novel holding members are provided, and engage the extremities of the handle and are adapted to securely lock the same to a stanchion or railing at any desired position therealong. The holding members are so constructed that the vitreous coating upon the handle proper is held out of contact with the said holding members and is accordingly protected against chipping and breaking.

Other objects and advantages will appear as the description proceeds, wherein it is to be understood that changes in the precise embodiment of our invention can be made within the scope of what is claimed, without departing from the spirit thereof.

The preferred embodiment of our invention is disclosed in the accompanying drawings, wherein:

Figure 1 is a fragmental view in perspective of the interior of a car, illustrating a stanchion and grab handle; Fig. 2 is an enlarged view in elevation, and partially in section, of a stanchion or railing with the grab handle mounted thereon; Fig. 3 is a view in horizontal section taken on the line 3—3 of Fig. 2; Fig. 4 is a detail view in perspective of the split bushing which, in connection with a cylindrical locking nut, rigidly secures the grab handle in place; Fig. 5 is a fragmental view in perspective of one extremity of the sleeve handle proper; and Fig. 6 is a view in longitudinal vertical section of a somewhat modified form of holding member for anchoring the sleeve handle to the stanchion or railing.

Referring specifically to the several views, the post or stanchion 10 represents the conventional form of pipe or support as used in cars, to which the passengers may hold. The intermediate portion of this stanchion, which alone serves as a grip or hand support, is provided with an elongated sleeve 11, upon which sleeve is an enamel or vitreous coating 12.

In order to lock the coated sleeve handle in place, locking members 13 are rigidly secured to the stanchion and engage the ends of the sleeve handle. These locking members are formed with a split bushing 14 having an externally tapered threaded portion 15; in connection with which, is provided a cylindrical nut 16. The cylindrical nut 16 engages the threaded portion of the split bushing and forcibly contracts the same against the side walls of the stanchion, and securely locks the two in place.

One extremity of the locking member is provided with an enlarged collar 19 which receives the extremity of the sleeve handle therein without contacting with the vitreous coating of the handle, thus preventing the coating from becoming chipped or marred.

In some instances, a further and more positive securement for the holding members is essential and, in which case, a cotter pin or analogous fastening means 16' is provided and extends through alined openings formed in the cylindrical nut 16, bushing 14 and stanchion 10. However, this fastening means may, in some cases, be omitted or, on the other hand, may be provided in both the upper and lower holding members.

The sleeve handle is prevented from rotating or turning upon the stanchion by providing the handle and holding members with interlocking ends. With this in view, the sleeve handle 10 is provided with the semi-cylindrical projection 18, and the bushings of the holding members are provided with similar semi-cylindrical projections 17. These projections fit one over the other, and prevent the relative motion of the two.

A somewhat modified form of handle securing member is disclosed in Fig. 6 and comprises a cylindrical body 20, the same fitting over the usual type of stanchion 22. The one extremity 21 of the holding member snugly receives the stanchion therethrough, and is rigidly affixed to the same by a key or analogous fastening means 23. The remote extremity of the holding member is provided with an enlarged flange or collar 24, which receives the sleeve handle 26 therein. This collar is provided with an internal ledge or shoulder 25, against which the extremity of the handle abuts. The collar 24 and sleeve handle 26 are provided with interlocking ends, in this instance, taking the form of a lug 28 projecting up from the ledge 25, and fitting within a small notch 27 formed in the sleeve handle.

What we claim is:

1. In combination, a rigid post, a sleeve handle mounted thereon and provided with a smooth exterior surface, handle securing couplings provided with openings of different sizes at the ends thereof, the ends of the couplings with the larger openings therein receiving the ends of the said sleeve handle, said couplings provided with shoulders intermediate their ends, the extremities of said sleeve handle abutting against said shoulders.

2. A hand support for cars, platforms and the like, comprising an upright rigid post, spaced couplings mounted on said post, the remote extremities of said couplings provided with openings receiving the post snugly therein, anchoring means extending through the said post, and the remote extremities of said couplings holding the same against motion, the confronting extremities of said couplings provided with enlarged openings and with shoulders defining the bottom wall of said openings, and a sleeve handle mounted on said post and extending within the confronting enlarged openings of said couplings and abutting against said shoulders, and means preventing the relative rotation of said couplings and said sleeve handle.

3. A hand support for cars comprising a sleeve handle with a vitreous coating thereon, said sleeve handle adapted to receive a cylindrical support therethrough, handle securing members adapted to rigidly engage said cylindrical support, said handle securing members and said sleeve handle provided with interlocking ends.

4. An article of the class described comprising a sleeve handle with a vitreous coating thereon and adapted to receive a cylindrical member therethrough, handle securing members adapted to rigidly engage said cylindrical member, said handle securing members receiving the extremities of said sleeve handle therein, and holding the same against movement with respect to said cylindrical member.

5. An article of the class described comprising a sleeve handle with a vitreous coating thereon, said sleeve handle adapted to receive a cylindrical member therethrough, to which said sleeve handle is to be secured, handle securing members provided with enlarged extremities receiving the extremities of said sleeve handle therein, said sleeve handles and handle securing members provided with interlocking extremities holding the two against relative rotation, the ends of said handle securing members projecting above, and spaced away from, the vitreous coating of said sleeve handle, and means carried by said handle securing members adapted to rigidly lock the same to said first-mentioned cylindrical member.

6. A hand support for cars, platforms and the like, consisting of an upright rigid post, a sleeve handle with a vitreous coating mounted on said post, holding members formed as couplings rigidly secured to said post, said holding members and sleeve handle provided with interlocking ends holding said sleeve handle and post against relative motion.

Signed at New York, borough of Manhattan, in the county of New York and State of New York, this 17th day of July A. D. 1916.

WILLIAM M. WAMPLER.
WALTER L. CONWELL.

Witnesses:
A. M. LINDENSTRUTH,
G. H. ORD.